United States Patent [19]
Emery et al.

[11] Patent Number: 5,925,944
[45] Date of Patent: Jul. 20, 1999

[54] TAPERED ELECTRODE AND VOLTAGE GRADING METHOD FOR HIGH VOLTAGE STATOR COILS

[75] Inventors: Franklin T. Emery, Orlando, Fla.; Jeffrey Neal Lankford, Fort Payne, Ala.

[73] Assignee: Siemens Westinghouse Power Corporation, Orlando, Fla.

[21] Appl. No.: 08/992,850

[22] Filed: Nov. 24, 1997

[51] Int. Cl.[6] .............................. H02K 3/40; H02K 3/34; H02K 15/12

[52] U.S. Cl. ........................... 310/45; 310/213; 310/196; 174/127

[58] Field of Search ................ 310/43, 45, 196, 310/260, 197, 270, 213, 214, 182; 336/223; 174/126.4, 127

[56] References Cited

U.S. PATENT DOCUMENTS

| | | | |
|---|---|---|---|
| 3,723,797 | 3/1973 | Andersson et al. | 310/196 |
| 3,975,653 | 8/1976 | Kawakami et al. | 310/196 |
| 3,990,034 | 11/1976 | Abbott | 367/169 |
| 4,207,482 | 6/1980 | Neumeyer et al. | 310/45 |
| 4,473,765 | 9/1984 | Butman, Jr. et al. | 310/215 |
| 5,319,276 | 6/1994 | Schuler | 310/196 |
| 5,729,068 | 3/1998 | Gasparini et al. | 310/179 |

*Primary Examiner*—Nestor Ramirez
*Assistant Examiner*—Judson H. Jones

[57] ABSTRACT

A tapered electrode with a rounded tab portion and a grading electrode is disclosed for minimizing the concentration of current flow to localized areas of the electrode. The tapered electrode comprises a base portion and a tab portion with a rounded end. The grading electrode comprises areas of varying width and relative resistance which operate to grade current flow away from the terminal portion of the tapered electrode tab.

11 Claims, 7 Drawing Sheets

TAPERED ELECTRODE AND VOLTAGE GRADING METHOD FOR HIGH VOLTAGE STATOR COILS

FIELD OF THE INVENTION

The present invention relates generally to electrical generators. More particularly, the present invention relates to an improved tapered electrode and improved grading method for use with high voltage stator coils.

BACKGROUND OF THE INVENTION

In high-powered electrical generators, it is customary to produce slots in the surface of the stator core into which electrical coils are placed. Typically, two stator coils are located in each stator slot. The coils are energized during generator operation.

The stator core is generally maintained at ground potential whereas the coils or windings in the stator slots have a relatively high potential. To protect against arcing between the two coils located in a single stator slot and between the stator core and the coils, it is customary to cover each of the coils with a conducting surface, referred to as an outer electrode. The outer electrode prevents gap discharges between the top and bottom coils as well as between the coils and the stator core. The outer electrode protects the coils from physical abrasion which would otherwise result from arcing. FIG. 1 provides a perspective view of the top 102 and bottom 104 coils at the slot exit 106 of a stator core 100. An outer electrode 108 is applied to each coil 102, 104 for the full length of the slot portion 106 of the stator core 100 and terminates at a position on the coil 102, 104 outside the stator slot 106. The outer electrode 108 is applied over a layer of insulating material 131 that is typically applied to the coils 102, 104.

As shown in FIG. 1, it is common for either one or both of the stator coils 102, 104 to bend at some location after exiting the stator core 100. This creates the problem whereby a portion of one of the coils, either the top 102 or the bottom 104 depending upon which coil is bent, is itself not covered by an outer electrode 108 and in close proximity to a portion of the opposite coil which is covered by an outer electrode having a very high voltage. This same problem can occur when two stator coils after exiting from two separate stator slots, cross in close proximity to one another. For stator coils of very high voltage rating, for example in excess of 18 kVrms, the difference in voltage potential between the outer electrode 108 of one stator coil and the coil endings of the opposite stator coil may become so large that arcing between the two coils could occur.

These problem situations are illustrated in FIGS. 2A and 2B. FIG. 2A provides a top view of the top 102 and bottom 104 coils exiting from the same stator slot. As shown, the top 102 and bottom 104 coils bend in opposite directions near the end of the outer electrode 108. The portion of the bottom coil 104 which corresponds to the area shown in cross section 110 is closely situated to the outer electrode 108 of the top coil 102 but is not itself covered by an outer electrode. The same holds for the bottom of the top coil 102. As noted above, the relative close proximity of two points with relatively high potential differences presents the possibility of arcing. FIG. 2B provides a view of two coils 111 which after exiting from two different stator slots, cross in close proximity to each other. Similar to the situation described above, a portion 110 of each coil 111 is placed in close proximity to a portion of the other coil which is at a very high voltage. Generally, in both of the above described situations a tapered electrode is applied to the coils. A tapered electrode is applied to the areas shown in cross section 110 to shield the un-shielded portions of either coil that is closely situated to a shielded portion on the opposite coil.

FIG. 2C provides a perspective view of a bottom coil 104 that has been prepared with a prior art tapered electrode 112. Although the tapered electrode is shown and described with reference to the bottom coil 104, it should be noted that it is necessary to apply the tapered electrode to both coils that may cross in close proximity to one another. The tapered electrode 112 is wrapped around the coil 104 and overlaps the end of the conducting outer electrode 108 so as to maintain electrical conductivity between the two. The tapered electrode 112 has a shorter width at one corner 114 of the coil 104 than opposite corner 116 of the coil 104. The electrode 112 can be said to be "tapered" between the two corners portions 114, 116 of differing length. It should be noted that the shape of the tapered electrode 112 on the top surface of the coil generally matches the shape of the cross sectioned area 110 shown in FIG. 2A. Thus, the tapered electrode 112 is geometrically shaped so that portions of a top 102 and bottom 104 electrode which are in close proximity to each other are electrically shielded. The tapered design insures that no portion of any one stator coil that is covered by the potentially high voltage outer electrode 108 is in close proximity to a stator coil that is not also shielded.

FIG. 3 provides a detailed view of the geometry of a prior art tapered electrode 112. In order to provide a more useful perspective, the tapered electrode 112 is shown unraveled and flattened. The tapered electrode 112 has a base portion 118 with a tab portion 120 extending therefrom. The tab portion 120 terminates in a straight line 122 between two sharp points 128, 130. The tab portion 120 gradually decreases in width as the distance from the base portion 118 of the electrode increases. Two tapered sides 124, 126 are formed between the base 118 of the electrode and the terminating straight line 122.

In FIG. 4A, the prior art tapered electrode 112 of FIG. 3 is shown applied to a stator coil 104. A tapered side 124 is shown running along the side of the coil 104 and terminating at a sharp point 128 at the intersection of the top and side surfaces. FIG. 4B provides a view of the bottom of the same coil 104 prepared with a tapered electrode 112. Similar to the prior figure, a tapered side 126 runs along the bottom of the coil 104 and terminates at a sharp point 130 at the intersection of two coil sides.

FIG. 5 depicts the current flow into the prior art tapered electrode 112. Again, the tapered electrode 112 is shown in an unraveled and flattened form for purposes of illustration. Arrows indicate current flow into the tapered electrode 112. As shown, the geometry of the tapered electrode 112 effects the flow of current into the electrode 112. In particular, the current flow concentrates at the two sharp points 128, 130 created at the intersection of the straight line 122 and the tapered sides 124, 126. The $I^2R$ loss is exaggerated at these points 128, 130 due to the high concentration of current. Such points 128, 130 are commonly referred to as "hot spots."

As shown in FIG. 6, a voltage grading electrode 132 is applied to the coils 102, 104 over the outer electrode, tapered electrode (not shown) and insulation 131. The voltage grading electrode 132 consists of a nonlinear resistive coating of paint or tape which provides a voltage current characteristic that is non-linear and prevents an abrupt change in voltage at the slot exit region. The voltage grading electrode 132 thereby reduces the level of voltage stress on the coils at the slot exit.

In those areas of the grading electrode that envelop the hot spots of the tapered electrode, the grading electrode experiences very high temperatures. The temperatures can become so high that the grading electrode material may burn and deteriorate the voltage grading properties of the grading electrode. Thus, the concentration of flow to the sharp points of the tapered electrode detrimentally affects the structure and performance of the coils.

It is therefore desirable to provide a tapered electrode and method of grading high voltage stator coils that minimizes the concentration of current flowing to isolated points on the tapered electrode.

SUMMARY OF THE INVENTION

Accordingly, it is the general object of the current invention to provide a tapered electrode and method of grading high voltage stator coils that minimizes the concentration of current to isolated points on the tapered electrode.

Briefly, this object, as well as other objects of the current invention, is accomplished in a tapered electrode comprising a base electrode portion and a tab extending from the base electrode portion wherein the width of the tab decreases with the distance from the base electrode portion and the tab has a substantially rounded end. The tapered electrode is formed from a conductive material, preferably conductive tape with a resistance less than 400 ohms/sq.

In accordance with another aspect of the invention there is provided a grading electrode comprising a first, second, and third layer of high resistive tape formed by wrapping resistive tape around a stator coil in a generally spiral fashion. The first layer of resistive tape begins at a location on the stator coil where the tapered portion of the tapered electrode meets a side wall of the coil and extends to a termination point overlapping the outer electrode. The second layer of resistive tape begins at the termination point of the first layer and extends away from the outer electrode for a length about 1.67 times the length of the first layer. The third layer of resistive tape begins at the termination of the first layer and extends away from the outer electrode for a length about 2.56 times the length of the first layer. The grading electrode is preferably made from one inch wide B staged resin rich tape with silicon carbide.

In accordance with another aspect of the invention there is provided a method of applying a grading electrode to a stator coil comprising the steps of wrapping a first layer of resistive tape around a stator coil in a generally spiral fashion, wrapping a second layer of resistive tape around the stator coil in a generally spiral fashion in a direct opposite the first layer, and wrapping a third layer of resistive tape around a stator coil in a generally spiral fashion over the first and second layers of tape.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed.

In the drawings.

DETAILED DESCRIPTION OF THE PREFERRED EMBODIMENTS

The present invention provides a rounded tapered electrode which eliminates the concentration of current flow into isolated points on the tapered electrode and thereby prevents "hot spots" from developing. The inventive tapered electrode is covered by a voltage grading electrode prepared by an inventive method which similarly operates to evenly distribute current into the tapered electrode.

Figure 1:
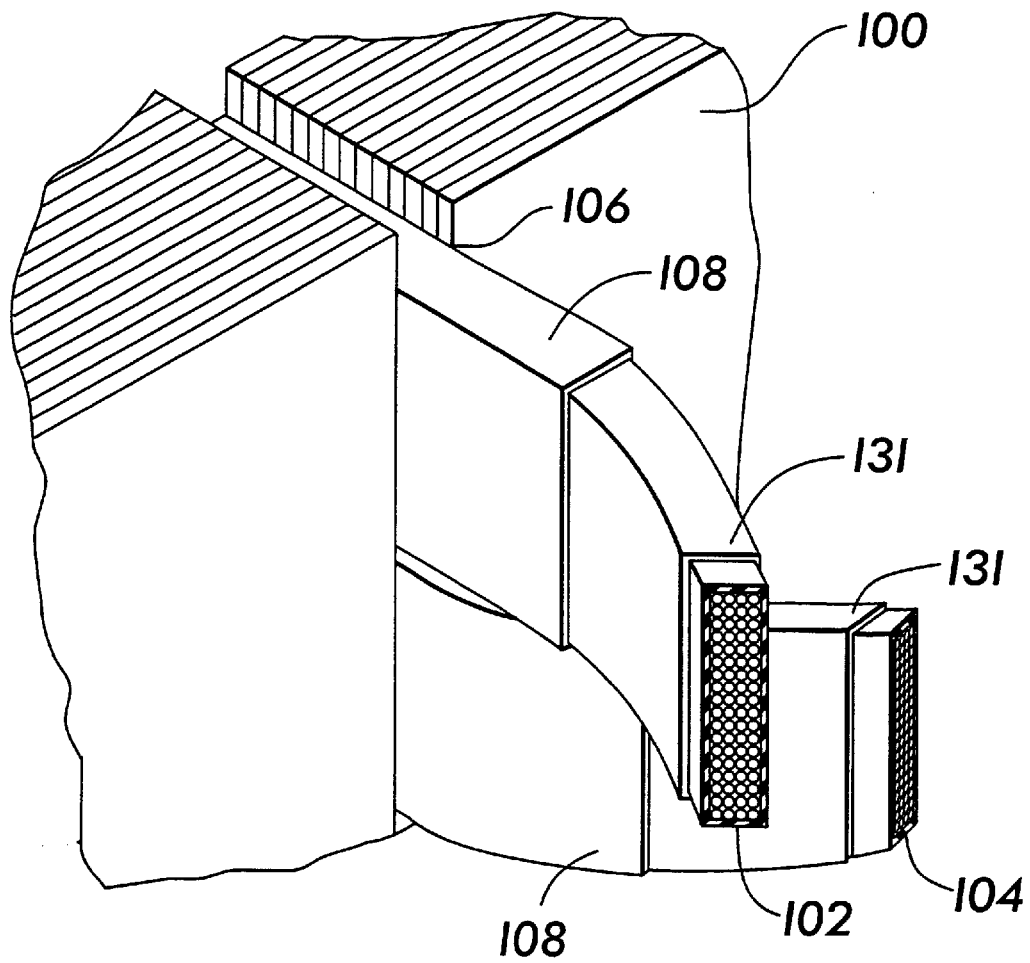
FIG. 1 is a perspective view of a top and bottom stator coils with an outer electrode at a stator core slot exit.
Figure 2A:
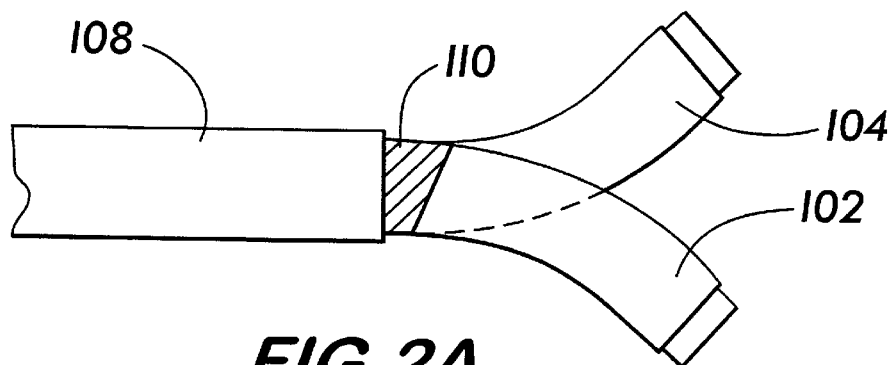
FIG. 2A is a top view of a top and bottom stator coils.
Figure 2B:
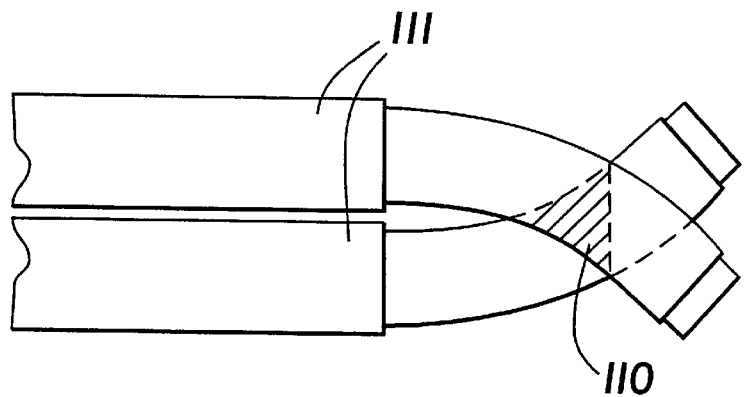
FIG. 2B is a view of two stator coils crossing in close proximity to one another after having exited from different stator slots.
Figure 2C:
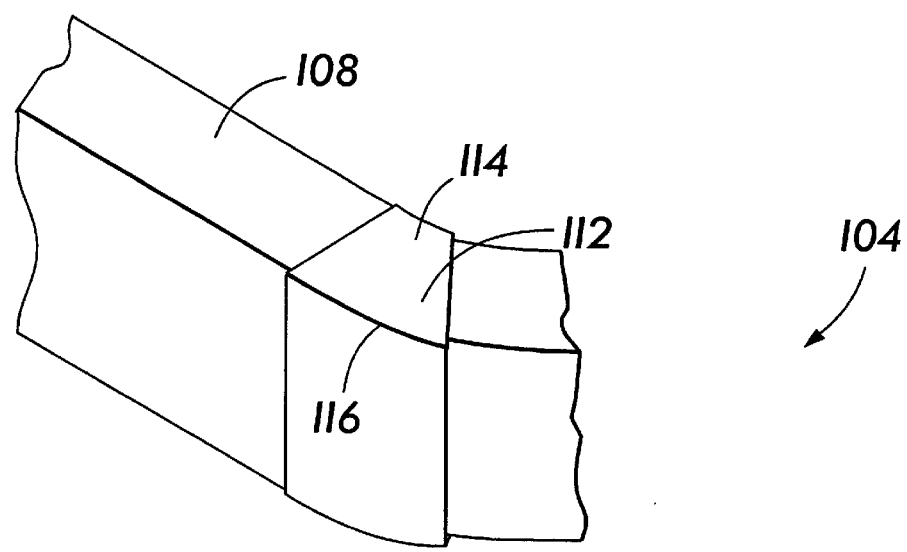
FIG. 2C is a perspective view of a stator coil prepared with a prior art tapered electrode.
Figure 3:
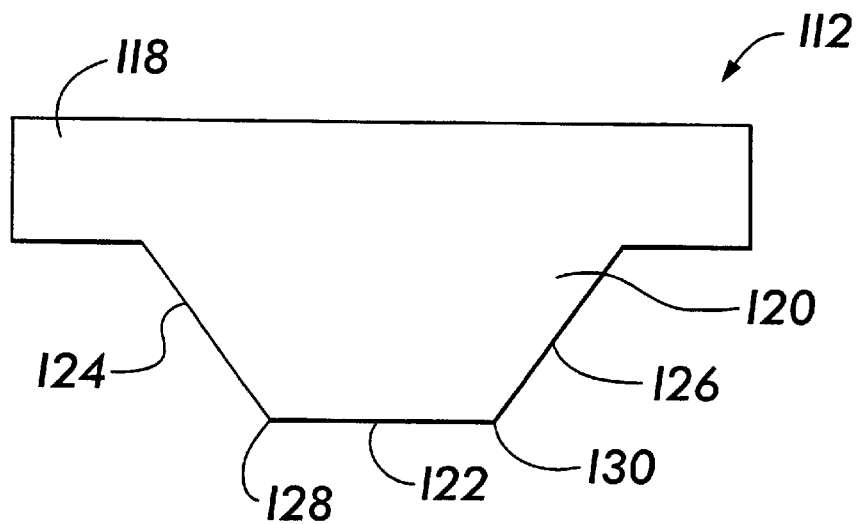
FIG. 3 provides a detailed view of a prior art tapered electrode.
Figure 5:
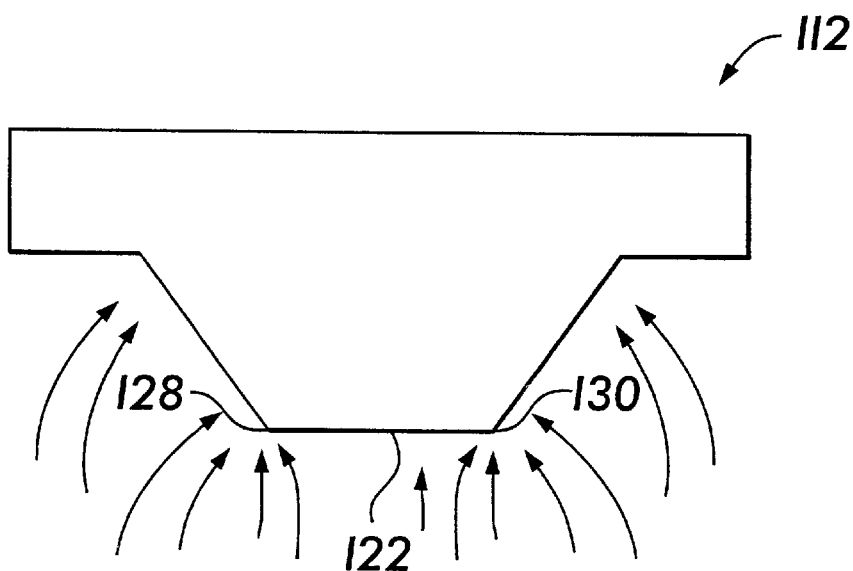
FIG. 5 is a view of the current flow into a prior art tapered electrode.
Figure 4A:
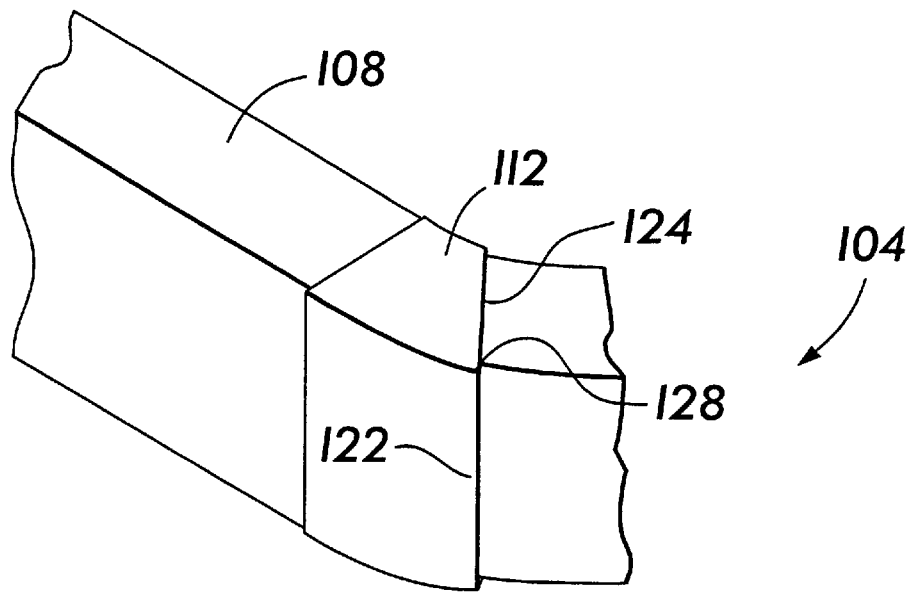
FIG. 4A is a top view of a stator coil prepared with a prior art tapered electrode.
Figure 4B:
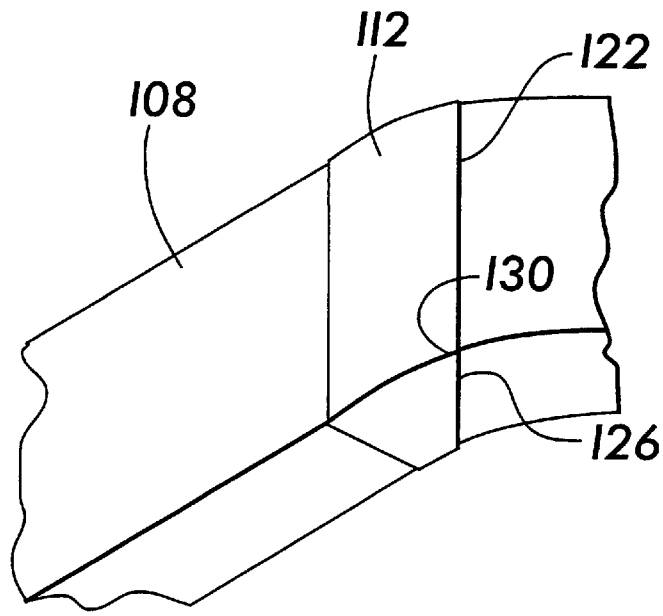
FIG. 4B is a bottom view of a stator coil prepared with a prior art tapered electrode.
Figure 6:
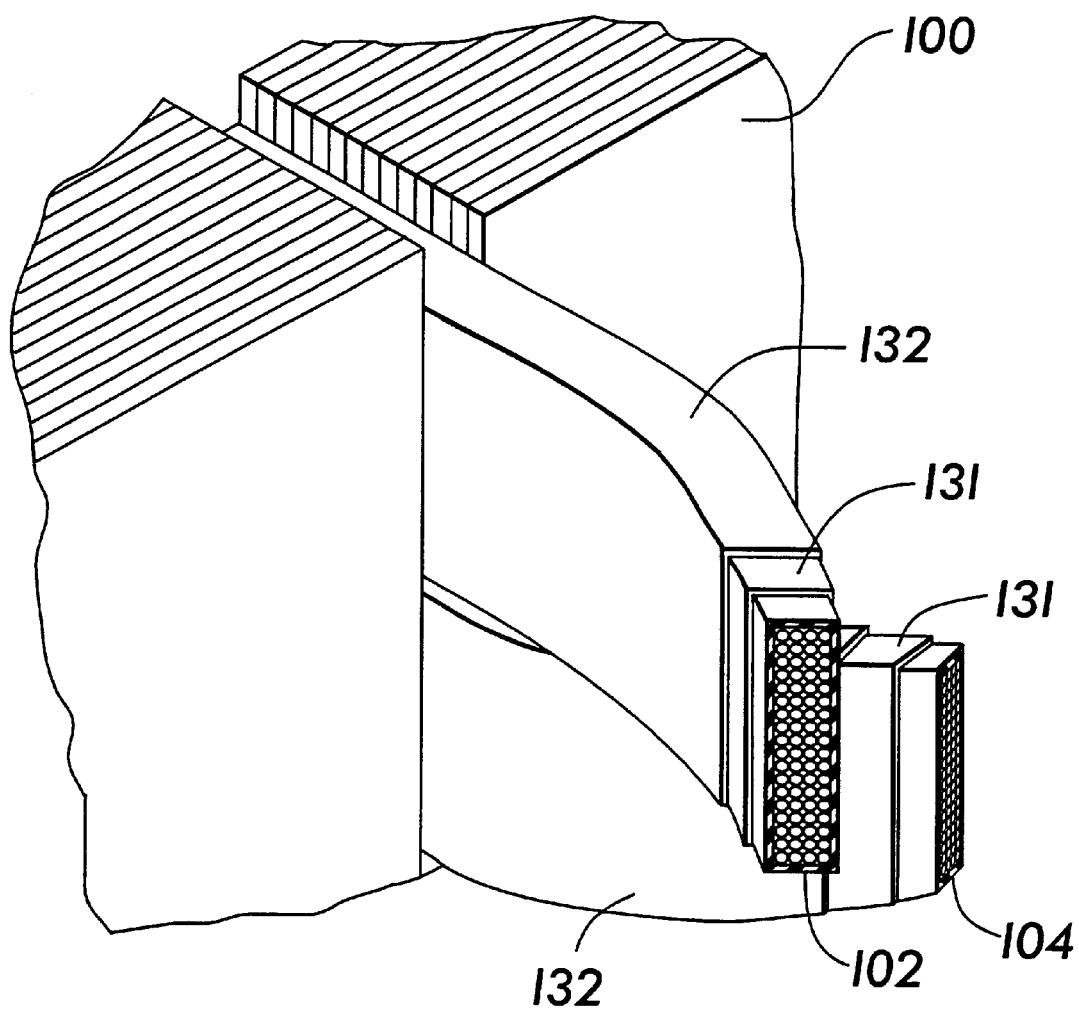
FIG. 6 is a perspective view of top and bottom stator coils with a grading electrode at a stator core slot exit.
Figure 7A:
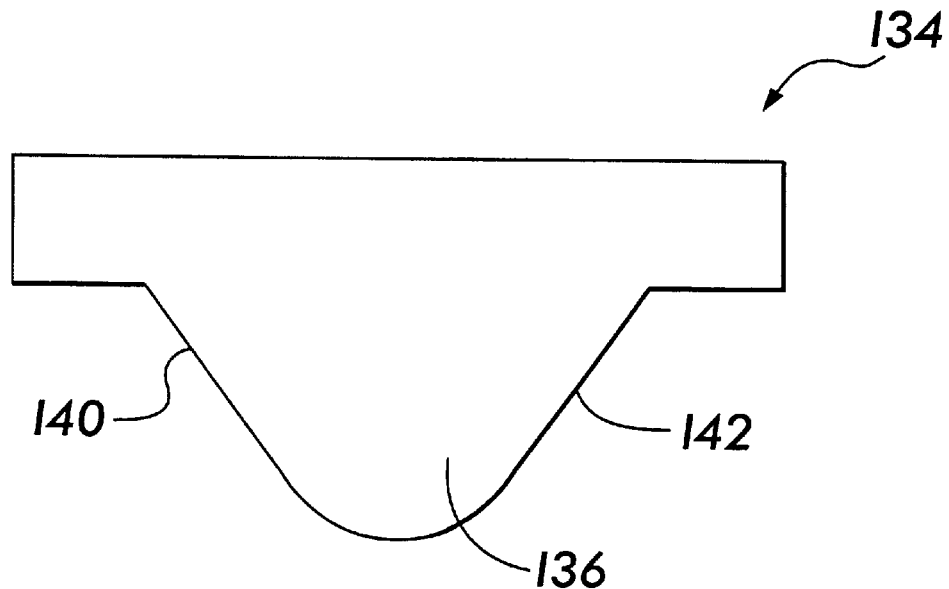
FIG. 7A is a detailed view of the inventive tapered electrode.
Figure 7B:
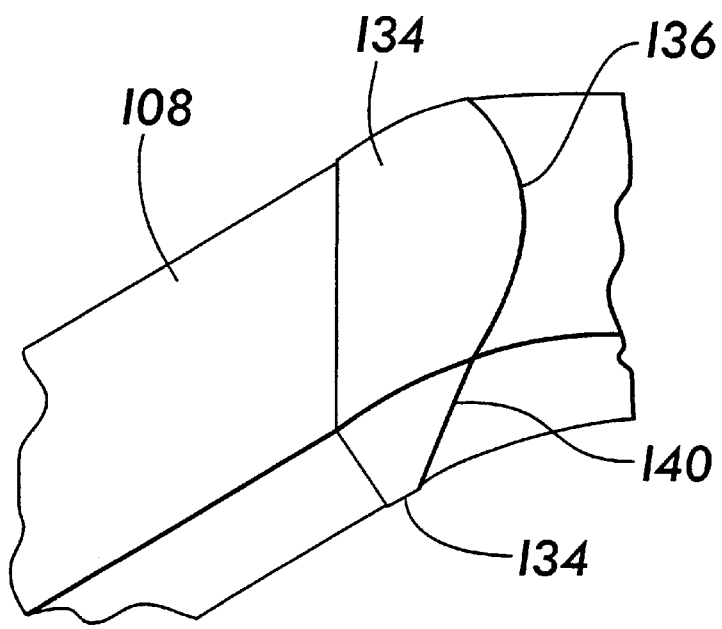
FIG. 7B is a perspective view of the inventive tapered electrode applied to a stator coil.

FIG. 7A provides a view of a tapered electrode 134 in accordance with the present invention. Unlike prior art tapered electrodes, the tab portion 136 of the inventive tapered electrode does not terminate at a straight line. Rather, as shown, the tapered electrode has a rounded tab portion and does not have the sharp points that characterize prior art electrodes. FIG. 7B provides a perspective view of the inventive tapered electrode 134 applied to a coil. The inventive tapered electrode maintains the tapered sides 140, 142 so as to continue the specialized shielding function. However, by eliminating the sharp points in the tab 136, the inventive tapered electrode lessens the concentration of current flow and eliminates the resulting hot spots.

In a preferred embodiment, the conducting outer electrode comprises a spiraling half-lapped layer of conducting tape which is wound around the insulating ground wall of the coil. The resistance of the conducting tape is below 400 ohms/sq. The conducting tape is applied at a tension equal to or less than the tension used to apply the ground wall tape.

The tapered electrode is likewise formed from conducting tape. In the preferred embodiment, the tapered electrode is cut from a piece of tape that is about six inches wide. The tapered electrode is formed in a shape as described above with reference to FIG. 7A. The tapered electrode overlaps the conducting outer electrode by about one inch so as to maintain electrical conductivity between the two. A layer of double adhesive tape is applied to the border of the tapered electrode to hold the tapered electrode in position over the conducting outer electrode.

The inventive voltage grading electrode is similarly designed to limit current flow to concentrated points on the tapered electrode. The voltage grading electrode is applied to the coil by winding layers of resistive tape onto the coil. The number of layers of tape applied to particular parts of the coil are strategically varied so as to control the resistance into the tapered electrode. In particular the resistance along the coil from the coil ends to the outer tapered electrode is gradually increased so as to grade the voltage difference between the tapered electrode and the coil ends. By controlling the resistance at various points along the electrode, the voltage grading electrode operates to mediate the current into various portions of the tapered electrode.

Generally, the resistance of a piece of material can be determined from the length of the material, the material's cross sectional area, and the resistivity constant of the material. In particular, the relationship is quantified by the equation:

$$R = \rho \iota / A$$

where $\rho$ is the resistivity of the material, $\iota$ is the length of the material, and A is the cross sectional area of the resistive material. Increasing the cross sectional area of the material decreases the resistance of the material. Therefore, in terms of the resistance of the grading electrode, the more layers of tape that are applied, the lower the resistance at that particular location of the electrode.

Figure 8A:
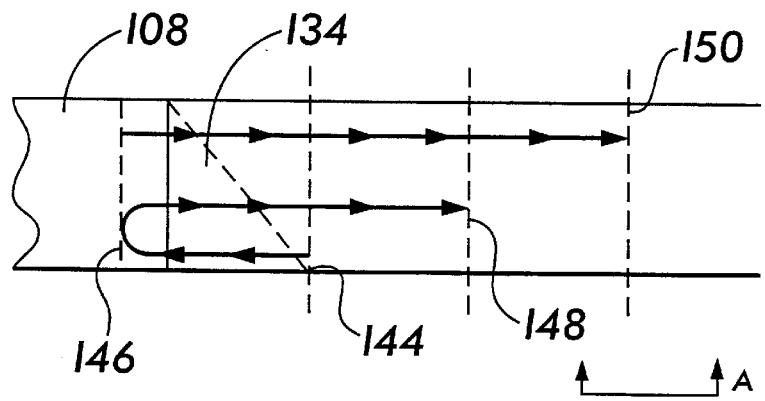
FIG. 8A is an illustration of the method of preparing a stator coil with the inventive grading electrode.
Figure 8B:
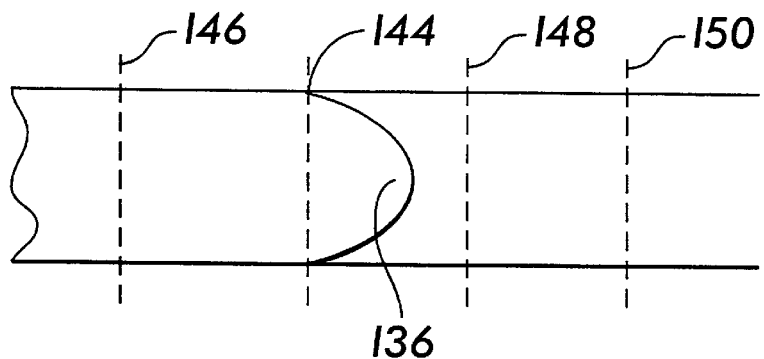
FIG. 8B is a side view of the stator coil shown in FIG. 8A.

FIGS. 8A and 8B illustrate the taping method used to form the inventive voltage grading electrode. FIG. 8A provides a view which could be either the bottom of the top coil or the top of the bottom coil. The outline of the tapered portion of the tapered electrode 134 is shown in dashed lines. FIG. 8B provides a side view taken along line A of the coil shown in FIG. 8A. The rounded tab portion 136 of the electrode is shown in dashed lines along the side of the coil. Generally, the grading electrode is formed by spirally winding a half-lapped layer of resistive tape around the coil. Arrows in FIG. 8A indicate the general direction along the length of the coil in which the spirals generally proceed.

A first layer of tape is wound around the coil over the tapered electrode 134 beginning at a location 144 on the sidewall where the tapered portion of the tapered electrode wraps around to the side of the coil. As indicated by the arrows, the first layer of taping spirals around the coil and extends towards the conducting electrode 108. At its end 146, the first layer of taping overlaps the end of conducting electrode 108 by about one inch. In the presently preferred embodiment the first layer of taping spirals about 4.5 inches from its beginning point 144 but in any event should extend from the point where the tapered portion of the electrode 134 wraps around the side wall of the coil to a point 146 overlapping the conducting outer electrode 108.

A second layer of taping begins at the location along the coil where the first layer of taping terminates 146, i.e. at the place where the first layer overlaps the conductive outer electrode 108. In the preferred embodiment, the same continuous piece of tape that is used to form the first layer is used to form the second tape layer. This is accomplished by simply reversing the direction of the taping when the end location of the first layer has been reached. The second layer of tape spirals around the coil away from the outer electrode and extends past the starting point 144 of the first layer of tape to its own termination point 148. Applicants have determined that the second layer of tape should be about 1.67 times the length of the first layer of tape. In the preferred embodiment, the second layer of tape is about 7.5 inches in length. The end of the second layer is taped to the coil using an adhesive backed tape.

A third layer of tape begins at the same point 146 along the coil where the first layer ended and the second layer began. As indicated by the arrows, the third layer spirals away from the conducting outer electrode and extends past the ending point 148 of the second layer of tape to its own termination point 150. Applicants have determined that the third layer of tape is about 2.56 times the length of the first layer. In the preferred embodiment, the third layer is about 11.50 inches in length. The end of the third layer is taped down using an adhesive backed tape.

In the presently preferred embodiment, the grading electrode is made using B staged resin rich tape with silicon carbide. The tape is one inch wide and has sufficient resin loading so that the resin seals the overlaps between tape layers and thereby prevents the impregnating resin from going between layers and affecting the electrical resistance of the tape.

As noted above, the resistance of a particular portion of the grading electrode is largely effected by the thickness or cross sectional area of the tape. The larger the cross sectional area, the lower the resistance. With respect to the grading electrode, the areas comprising three layers of taping have the lowest resistance; the areas coated with two wrappings of tape have the second lowest resistance; and the area of the grading electrode comprising only a single layer of tape has the relative highest resistance.

Figure 9:
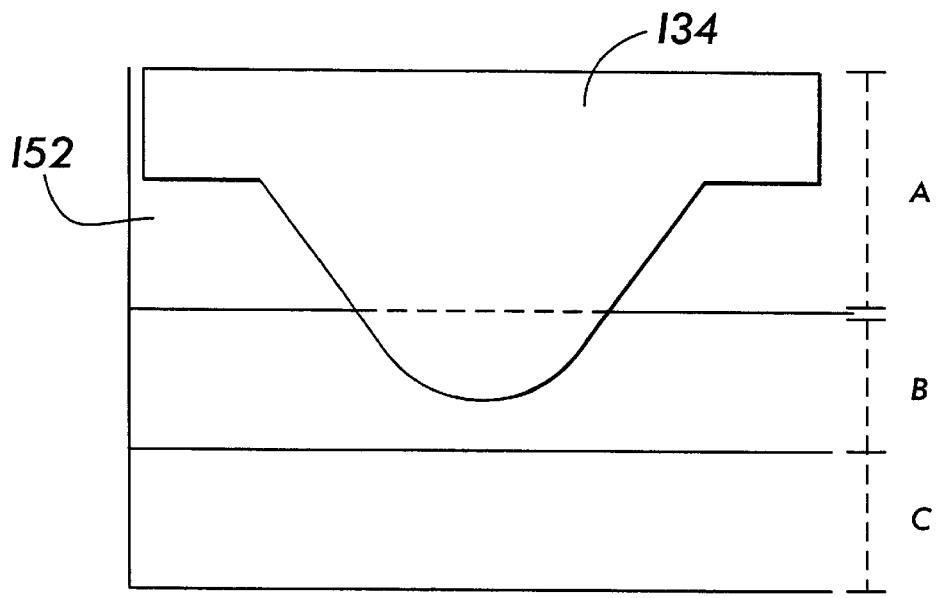
FIG. 9 is a detailed flattened view of an inventive grading electrode applied to an inventive tapered electrode.

FIG. 9 provides a flattened view of the inventive tapered electrode 134 covered by the inventive voltage grading electrode 152. The voltage grading electrode 152 is shown divided into three parts, A, B, and C which represent areas having varying number of tape layers which comprise the grading electrode 152. Area A, or the area closest to the base of the tapered electrode 134 represents the portion of the grading electrode 152 comprising three layers of tape. As noted above, the three layered area has the lowest resistance in the grading electrode due to the relative thickness of the grading tape. Because of the relative low resistance in this area of the grading electrode, current should flow most easily towards the portions of tapered electrode enveloped in this area of the grading electrode, i.e. the tapered sides of the electrode.

The second area B, corresponding to the portion of the grading electrode with two tape layers has a higher resistance than the three wrap layer. As can be recalled from referring to FIG. 8, the double layer of wrapping B begins at the portion of the tapered electrode 134 where the tapered electrode 134 wraps around to the side of the coil. The double layer also envelops the rounded portion of the tapered electrode 134. The higher relative resistivity of the grading electrode over this portion of the tapered electrode, as compared to the three layer area, has the effect of grading current to flow into the tapered sides of the tapered electrode rather than concentrating at the rounded tip portion of the electrode.

The third portion C, corresponding to the area with one layer of tape, has the highest relative resistance. As shown, the single layer of taping does not envelop any portion of the tapered electrode. However, like the two layer area, the relative high resistance of the three layer portion of the grading electrode functions to grade the current into the tapered electrode. The single layer of high resistance tape provides a resistance transition from the high surface resistance of the coil surface to the significantly lower resistance of the tapered electrode.

Applicants manufactured and tested a stator winding prepared with a tapered electrode and grading electrode in accordance with the invention. The winding was subject to a voltage ground test at 68.9 kVrms for 1 minute. No voltage flash-over occurred and no excessive heating of the voltage grading tape resulted. Immediately following the voltage ground test, the voltage grading area was inspected for signs of overheating. Although the area was warm to the touch which indicated current flow had occurred, no burning or breakdown had taken place. This indicates that the voltage grading tape had performed properly.

The present invention may be embodied in other specific forms without departing from the spirit or essential attributes thereof. For example, the tapered electrode may be formed by means other than conductive tape such as metal foil. Similarly, the grading electrode may be composed from grading materials other than tape such as paint. Further the grading electrode may comprise more or less than three layers of grading material. Accordingly, reference should be made to the appended claims, rather than to the foregoing specification, as indicating the scope of the invention.

We claim:

1. A tapered electrode for providing asymmetrical voltage distribution between a stator winding end and a stator core, comprising:
    a base electrode portion; and
    a tab extending from said base electrode portion wherein the width of said tab decreases with the distance from said base electrode portion and said tab has a substantially rounded end.

2. A tapered electrode as recited in claim 1 wherein said tapered electrode is formed from a conductive material with a resistance less than 400 ohms/sq.

3. A tapered electrode as recited in claim 2 wherein said conductive material is conductive tape.

4. A tapered electrode for providing asymmetrical voltage distribution between a stator winding end and a stator core, comprising:
    a base electrode portion; and
    a tab extending from said base electrode portion wherein the width of said tab decreases with the distance from said base electrode portion and said tab has a substantially rounded end, wherein said tapered electrode is formed from a conductive tape with a resistance less than 400 ohms/sq.

5. A grading electrode applied to a stator coil having a top wall, bottom wall, and two side walls, said stator coil having applied thereto an outer electrode and a tapered electrode with a tapered portion, comprising:
    a first layer of resistive tape formed by wrapping resistive tape around a stator coil in a generally spiral fashion, said first layer having a length beginning at a location on the stator coil where the tapered portion of the tapered electrode meets a side wall of the coil and extending to a termination point overlapping the outer electrode;
    a second layer of resistive tape formed by wrapping resistive tape around the stator coil in a generally spiral fashion, said second layer beginning at the termination point of said first layer and extending away from the outer electrode for a length about 1.67 times the length of said first layer; and
    a third layer of resistive tape formed by wrapping a layer of resistive tape around a stator coil in a generally spiral fashion, said third layer beginning at the termination of said first layer and extending away from the outer electrode for a length about 2.56 times the length of the first layer.

6. A grading electrode as recited in claim 5 wherein said grading electrode overlaps the outer electrode by at least one inch.

7. A grading electrode as recited in claim 5 wherein said first layer of resistive tape is about 4.5 inches long, said second layer of resistive tape is about 7.5 inches long, and said third layer of resistive tape is about 11.5 inches long.

8. A grading electrode as recited in claim 5 wherein said grading electrode is made from B staged resin rich tape with silicon.

9. A grading electrode as recited in claim 5 wherein the resistive tape is one inch wide.

10. A grading electrode applied to a stator coil having a top wall, bottom wall, and two side walls, said stator coil having applied thereto an outer electrode and a tapered electrode with a tapered portion, comprising:
    a first layer of resistive tape formed by wrapping resistive tape around a stator coil in a generally spiral fashion, said first layer having a length of about 4.5 inches beginning at a location on the stator coil where the tapered portion of the tapered electrode meets a side wall of the coil and extending to a termination point overlapping the outer electrode;
    a second layer of resistive tape formed by wrapping resistive tape around the stator coil in a generally spiral fashion, said second layer beginning at the termination point of said first layer and extending away from the outer electrode for a length about 7.5 inches; and
    a third layer of resistive tape formed by wrapping a layer of resistive tape around a stator coil in a generally spiral fashion, said third layer beginning at the termination of said first layer and extending away from the outer electrode for a length about 11.5 inches, wherein said grading electrode overlaps the outer electrode by at least one inch and said grading electrode is made from one inch wide B staged resin rich tape with silicon.

11. A method of applying a grading electrode to a stator coil having a top wall, bottom wall, and two side walls, said stator coil having an outer electrode applied thereto, comprising:
    wrapping a first layer of resistive tape around a stator coil in a generally spiral fashion, beginning at the location on the stator coil where the tapered portion of the tapered electrode meets a side wall of the coil and extending to a termination point overlapping the outer electrode;
    wrapping a second layer of resistive tape around the stator coil in a generally spiral fashion, beginning at said termination point of the first layer and extending away from said outer electrode for a length about 1.67 times the length of the first layer; and
    wrapping a third layer of resistive tape around a stator coil in a generally spiral fashion, beginning at said termination of the first layer and extending away from said outer electrode for a length about 2.56 times the length of the first layer.

* * * * *